UNITED STATES PATENT OFFICE.

DAVID C. TAYLOR, OF GOSHEN, NEW YORK.

IMPROVED LUBRICATING COMPOUND.

Specification forming part of Letters Patent No. 50,049, dated September 19, 1865.

*To all whom it may concern:*

Be it known that I, DAVID C. TAYLOR, of Goshen, in the county of Orange and State of New York, have invented a new and Improved Lubricating Compound; and I do hereby declare that the following is a full, clear, and exact description thereof, which will enable those skilled in the art to make and use the same.

This invention relates to a compound which may be used with advantage for journals or bearings of any desired description, and which is particularly intended to prevent said bearings from running hot.

My lubricating material is composed of oil, emery, and sulphur, which are mixed together in about the following proportion: oil, one gallon; emery, three ounces; sulphur, five ounces.

Common oil or lard can be used for my composition, and the emery and sulphur before being mixed with the oil or lard are reduced to a fine powder. As soon as the ingredients have been thoroughly mixed together, which is done by stirring or by agitation, either hot or cold, the compound is ready for use.

By the action of the emery the box to which my compound is applied is made to fit the bearing exactly, and the sulphur keeps the metal smooth and cool, while the oil lubricates the same. The formation of gum or scale in the box or on the surface of the journal is effectually prevented, and the axle or journal to which my compound is applied will not heat, and it works with the least possible friction.

I claim as new and desire to secure by Letters Patent—

A lubricating compound made of the ingredients herein set forth, and mixed together substantially in the manner and about in the proportion specified.

DAVID C. TAYLOR.

Witnesses:
    F. A. HOYT,
    JOHN WALLACE.